US012671270B2

(12) United States Patent
Kuperman

(10) Patent No.: US 12,671,270 B2
(45) Date of Patent: Jun. 30, 2026

(54) GENERALIZED SINGLE-SIDE COMPENSATION NETWORKS FOR INDUCTIVE WIRELESS POWER TRANSFER SYSTEMS

(71) Applicant: B.G. NEGEV TECHNOLOGIES AND APPLICATIONS LTD., AT BEN-GURION UNIVERSITY, Beer-Sheva (IL)

(72) Inventor: Alon Kuperman, Beer-Sheva (IL)

(73) Assignee: B.G, Negev Technologies and Applications Ltd., at Ben-Gurion University, Beer-Sheva (IL)

( * ) Notice: Subject to any disclaimer, the term of this patent is extended or adjusted under 35 U.S.C. 154(b) by 0 days.

(21) Appl. No.: 18/726,991

(22) PCT Filed: Jan. 5, 2023

(86) PCT No.: PCT/IL2023/050020
§ 371 (c)(1),
(2) Date: Jul. 5, 2024

(87) PCT Pub. No.: WO2023/131954
PCT Pub. Date: Jul. 13, 2023

(65) Prior Publication Data
US 2025/0167594 A1 May 22, 2025

Related U.S. Application Data

(60) Provisional application No. 63/296,884, filed on Jan. 6, 2022.

(51) Int. Cl.
*H02J 50/12* (2016.01)
*H02M 1/00* (2007.01)

(52) U.S. Cl.
CPC ........... *H02J 50/12* (2016.02); *H02M 1/0038* (2021.05)

(58) Field of Classification Search
CPC .... H02J 50/12; H02M 1/0038; H02M 1/0058; H02M 3/01; H02M 3/33573; H01F 38/14; H01F 27/42
See application file for complete search history.

(56) References Cited

U.S. PATENT DOCUMENTS

| | | | |
|---|---|---|---|
| 10,424,970 B2 * | 9/2019 | Zhang | H02M 3/33573 |
| 12,224,113 B2 * | 2/2025 | Raminosoa | H01F 27/327 |

(Continued)

FOREIGN PATENT DOCUMENTS

| | | |
|---|---|---|
| CN | 112202251 A | 1/2021 |
| KR | 20130098916 A | 9/2013 |

OTHER PUBLICATIONS

Zhang et al.; Loosely coupled transformer structure and interoperability study for EV wireless charging systems. IEEE Transactions on Power Electronics 30 Nov. 30, 2015 (12 pages).

(Continued)

*Primary Examiner* — Menatoallah Youssef
*Assistant Examiner* — Michael J Warmflash
(74) *Attorney, Agent, or Firm* — Roach Brown McCarthy & Gruber, P.C.; Kevin D. McCarthy

(57) ABSTRACT

An efficiently compensated Inductive Wireless Power Transfer (IWPT) system, comprising an LCT having a primary side and a secondary side; an inverter that converts the input DC power to AC power at a predetermined operating frequency, the output of the inverter is being connected to the self-inductance of the primary side of the LCT via a compensation network consisting of a combination of capacitors and at least one inductor and residing solely at the primary side; a rectifier for converting AC power, induced at (Continued)

the secondary side of the LCT, to DC power, the input of the rectifier is being connected to the self-inductance of the secondary side of the LCT; a load being connected to the output of the rectifier; a DC power supply for feeding DC power to the input of the inverter and generating an induced power that is fed to the load.

20 Claims, 6 Drawing Sheets

(56) References Cited

U.S. PATENT DOCUMENTS

| | | | | |
|---|---|---|---|---|
| 2014/0015328 A1* | 1/2014 | Beaver | | H02J 7/34 |
| | | | | 307/104 |
| 2015/0015197 A1* | 1/2015 | Mi | | H02J 7/92 |
| | | | | 320/108 |
| 2019/0115788 A1* | 4/2019 | Zhang | | H02M 3/33571 |
| 2021/0021156 A1* | 1/2021 | Maniktala | | H01F 27/42 |
| 2021/0226473 A1* | 7/2021 | Mao | | H02M 7/219 |
| 2021/0358686 A1* | 11/2021 | Raminosoa | | H01F 38/18 |

OTHER PUBLICATIONS

Su et al.; A Graphical Design, Methodology Based on Ideal Gyrator and Transformer for Compensation Topology with Load-Independent Output in Inductive Power Transfer System Mar. 1, 2021 (12 pages).

Buchmeier et al, "Optimized NFC Circuit and Coil Design forWireless Power Transfer with 2D Free-Positioning and Low Load Sensibility" Sensors 2021, 21, 8074. https://doi.org/10.3390/s21238074 (22 pages).

International Search Report for PCT/IL2023/050020, mailed Apr. 2, 2023 (5 pages).

Written Opinion of the International Searching Authority for PCT/IL2023/050020, mailed Apr. 2, 2023 (5 pages).

Yang Lin et al: "Analysis and Design of an LCCC/S-Compensated WPT System With Constant Output Characteristics for Battery Charging Applications", IEEE Journal of Emerging and Selected Topics in Power Electronics, IEEE, Piscataway, NJ, USA, vol. 9, No. 1, Feb. 4, 2020 (Feb. 4, 2020), pp. 1169-1180, XP011832676, (12 pages).

Wang Dule et al: "Hybrid Inductive-Power-Transfer Battery Chargers for Electric Vehicle Onboard Charging With Configurable Charging Profile", IEEE Transactions on Intelligent Transportation Systems, IEEE, Piscataway, NJ, USA, vol. 22, No. 1, Mar. 4, 2020 (Mar. 4, 2020), pp. 592-599, XP011827744, ISSN: 1524-9050, DOI: 10.1109/TITS.2020.2976647 [retrieved on Dec. 24, 2020] (8 pages).

Liu Wei et al: "Hybrid Frequency Pacing for High-Order Transformed Wireless Power Transfer" IEEE Transactions on Power Electronics, Institute of Electrical and Electronics Engineers, USA, vol. 36, No. 1, Jun. 17, 2020 (Jun. 17, 2020), pp. 1157-1170, XP011808062,ISSN: 0885-8993, DOI: 10.1109/TPEL.2020.3002986 [retrieved on Sep. 7, 2020] (14 pages).

Supplementary European Search Report for EP 23 73 7261, completed Apr. 15, 2025 (3 pages).

\* cited by examiner $$\beta = 1 \Rightarrow \omega \cdot L_{1,2} = \frac{1}{\omega \cdot C_{1,2}}$$

GENERALIZED SINGLE-SIDE COMPENSATION NETWORKS FOR INDUCTIVE WIRELESS POWER TRANSFER SYSTEMS

FIELD OF THE INVENTION

The present invention relates to the field of inductive wireless power transfer. More particularly, the invention relates to generalized compensation networks for Inductive Wireless Power Transfer Links (IWPTLS), which reside only at the primary or the secondary side of a Loosely Coupled Transformer (LCT).

BACKGROUND OF THE INVENTION

Resonant inductive wireless power delivery technology has become a viable alternative for applications, in which conventional wires-based power distribution is impossible or undesirable. For example, an IWPTL may be used for applications such as charging the battery of an electric vehicle. A Typical IWPTL is formed by an inverter, an LCT that consists of a primary coil and a secondary coil which are magnetically coupled (typically via non-magnetic medium), corresponding passive compensation networks, and a rectifier. FIG. 1A illustrates the concept of inductive wireless power transfer using an LCT. A magnetic flux generated in the primary side inductor L1 will induce corresponding voltage across the secondary side inductor L2.

Due to loose coupling, leakage inductances of the LCT are relatively high, calling for compensation networks aimed to increase power transfer capability and efficiency, as well as decrease inverter volt-ampere rating. Compensation networks are typically placed at both LCT sides yet they do not have to be identical. However, it is sometimes desired to reduce the complexity, physical size and cost of either transmitter or receiver of the IWPTL by minimizing or eliminating corresponding compensation network while preserving the desired functionality.

It is therefore an object of the present invention to provide generalized compensation networks for IWPTLS, residing only at the primary or the secondary side of the LCT.

It is another object of the present invention to provide generalized compensation networks for IWPTLS, capable of simultaneously achieving arbitrary Load Independent Voltage Output (LIVO) and a Zero-Phase Angle (ZPA).

It is a further object of the present invention to provide generalized compensation networks for IWPTLS, capable of simultaneously achieving arbitrary Load Independent Voltage Output (LIVO) and Zero-Voltage Switching (ZVS).

It is yet another object of the present invention to provide generalized compensation networks for IWPTLS, which allow reducing the weight and/or volume and/or cost of the transmitter or of the receiver.

Other objects and advantages of the invention will become apparent as the description proceeds.

SUMMARY OF THE INVENTION

A method for efficiently compensating an Inductive Wireless Power Transfer (IWPT) system, comprising:
- a) providing an LCT having a primary side and a secondary side;
- b) providing a DC power supply for feeding input DC power to the IWPT system;
- c) providing an inverter that converts the input DC power to AC power at a predetermined operating frequency;

- d) connecting the output of the inverter to the self-inductance ($L_P$) of the primary side of the LCT via a compensation network consisting of a combination of capacitors and at least one inductor and residing solely at the primary side;
- e) providing a rectifier for converting AC power, induced at the secondary side of the LCT, to DC power;
- f) connecting the input of the rectifier to the self-inductance ($L_S$) of the secondary side of the LCT;
- g) connecting a load to the output of the rectifier; and
- h) feeding DC power to the input of the inverter and generating an induced power that is fed to the load.

The compensation network may comprise:
- a) a first inductor ($L_{P2}$) connected in parallel to the input of the primary side;
- b) a first capacitor ($C_{P1}$) connected in series with the self-inductance ($L_{P1}$) of the primary side, for compensating voltage drops across the self-inductance ($L_{P1}$) of the primary side;
- c) a second capacitor ($C_{P3}$) connected in series with the first capacitor ($C_{P1}$), for compensating voltage drops across the reflection ($L_{C3}$) of the self-inductance of the secondary side to the primary side; and
- d) a third capacitor ($C_{P2}$), one contact of which being connected to one contact of the primary coil of the LCT, and the other contact of which being connected to the mutual point connecting between the second capacitor ($C_{P3}$) and the first capacitor ($C_{P1}$), for compensating voltage drops across the first inductor ($L_{P2}$).

A compensation inductance (L) may be connected in series between the output of the inverter and the compensating capacitance ($C_{P3}$), for absorbing unwanted high voltage spikes.

The inductances to be compensated at the primary side may be $$L_P = \left(1 - k\alpha^{-1}\right)L_1,$$

$$L_C = k\alpha^{-1}L_1,$$

$$L_S = (1 - \alpha k)L_2,$$

$$n = \alpha\sqrt{\frac{L_2}{L_1}}$$

with an arbitrary $\alpha$ residing within $$k\sqrt{\frac{L_2}{L_1}} \le \alpha \le \frac{1}{k}\sqrt{\frac{L_2}{L_1}}.$$

The secondary-side equivalent inductances as reflected to the primary side may be $$L_{P1} = \left(1 - k\alpha^{-1}\right)L_1,$$

$$L_{P2} = k\alpha^{-1}L_1,$$

$$L_{P3} = \frac{L_S}{n^2} = \frac{1 - \alpha k}{\alpha^2}L_1.$$

The primary-side equivalent inductances as reflected to the secondary may be $$L_{S1} = (1 - \alpha k)L_2,$$

$$L_{S2} = L_C n^2 = \alpha k L_2,$$

$$L_{S3} = L_P n^2 = (1 - k\alpha 1)\alpha^2 L_2.$$

The compensating capacitors may be selected as $$C_{P1} = \frac{1}{\omega^2 L_{P1}} = \frac{1}{\omega^2 (1 - k\alpha^{-1})L_1},$$

$$C_{P2} = \frac{1}{\omega^2 L_{P2}} = \frac{1}{\omega^2 k\alpha^{-1}L_1},$$

$$C_{P3} = \frac{1}{\omega^2 (L_{P3} + L)} = \frac{1}{\omega^2 \left(\frac{1 - \alpha k}{\alpha^2}L_1 + L\right)}$$

The compensating capacitors may be selected as $$C_{S1} = \frac{1}{\omega^2 L_{S1}} = \frac{1}{\omega^2 (1 - \alpha k)L_2},$$

$$C_{S2} = \frac{1}{\omega^2 L_{S2}} = \frac{1}{\omega^2 \alpha k L_2},$$

$$C_{S3} = \frac{1}{\omega^2 (L_{S3} + L)} = \frac{1}{\omega^2 ((1 - k\alpha 1)\alpha^2 L_2 + L)}$$

The inverter output impedance at operating frequency may be $$\vec{Z}_{inv}(\omega) = \frac{1}{n^2}\left(R_L + j\left(\omega L + \omega L_{S3} - \frac{1}{\omega C_{S3}}\right)\right)$$

The inverter phase angle may be $$\varphi = \arg \vec{Z}_{inv}(\omega) = tg^{-1}\frac{\omega L + \omega L_{S3} - (\omega C_{S3})^{-1}}{R_L}.$$

A load-independent voltage gain under sinusoidal excitation may be $$G_V = \frac{|\vec{v}_{rec}|}{|\vec{v}_{inv}|} = n = \left|\alpha\sqrt{\frac{L_2}{L_1}}\right|$$

An arbitrary load-independent voltage gain $G^*_V$ for a certain loosely-coupled transformer may be obtained by setting a to be $$|\alpha| = G^*_V\sqrt{\frac{L_1}{L_2}}$$

and setting the compensation capacitances to be $$C_{S1} = \frac{1}{\omega^2 L_{S1}} = \frac{1}{\omega^2 (1 - \alpha k)L_2}, C_{S2} = \frac{1}{\omega^2 L_{S2}} = \frac{1}{\omega^2 \alpha k L_2},$$

-continued $$C_{S3} = \frac{1}{\omega^2 (L_{S3} + L)} = \frac{1}{\omega^2 ((1 - k\alpha^{-1})\alpha^2 L_2 + L)}$$

A method for efficiently compensating an Inductive Wireless Power Transfer (IWPT) system, comprising:

a) providing an LCT having a primary side and a secondary side;

b) providing a DC power supply for feeding input DC power to the IWPT system;

c) providing an inverter that converts the input DC power to AC power at a predetermined operating frequency;

d) connecting the output of the inverter to the self-inductance of the primary side of the LCT;

e) providing a rectifier for converting AC power, induced at the secondary side of the LCT, to DC power;

f) connecting the input of the rectifier to the self-inductance of the secondary side of the LCT via a compensation network consisting of a combination of capacitors and at least one inductor and residing solely at the secondary side;

g) connecting a load to the output of the rectifier; and h) feeding DC power to the input of the inverter and generating an induced power that is fed to the load.

The compensation network comprises:

a) a first inductor ($L_{S2}$) connected in parallel to the input of the primary side;

b) a first capacitor ($C_{S1}$) connected in series with the self-inductance ($L_{S1}$) of the primary side, for compensating voltage drops across the self-inductance ($L_{S1}$) of the primary side;

c) a second capacitor ($C_{S3}$) connected in series with the first capacitor ($C_{S1}$), for compensating voltage drops across the reflection ($L_{S3}$) of the self-inductance of the secondary side to the primary side; and d) a third capacitor ($C_{S2}$), one contact of which being connected to one contact of the primary coil of the LCT, and the other contact of which being connected to the mutual point connecting between the second capacitor ($C_{S3}$) and the first capacitor ($C_{S1}$), for compensating voltage drops across the first inductor ($L_{S2}$).

The primary-side equivalent inductances as reflected to the secondary side may be $$L_{S1} = (1 - \alpha k)L_2,$$

$$L_{S2} = L_C n^2 = \alpha k L_2, L_{S3} = L_P n^2 = (1 - k\alpha^{-1})\alpha^2 L_2.$$

The compensating capacitors may be selected as $$C_{S1} = \frac{1}{\omega^2 L_{S1}} = \frac{1}{\omega^2 (1 - \alpha k)L_2}, C_{S2} = \frac{1}{\omega^2 L_{S2}} = \frac{1}{\omega^2 \alpha k L_2},$$

$$C_{S3} = \frac{1}{\omega^2 (L_{S3} + L)} = \frac{1}{\omega^2 ((1 - k\alpha^{-1})\alpha^2 L_2 + L)}$$

The compensation network may comprise:

a) a first capacitor ($C_{P1}$) connected in series with the self-inductance ($L_1$) of the primary side, for compensating voltage drops across the self-inductance ($L_1$) of the primary side;

b) an inductor (L) connected in series with the output of the inverter; and c) a second capacitor ($C_{P2}$), one contact of which being connected to one contact of the primary coil of the LCT, and the other contact of which being connected to the mutual point connecting between the first capacitor ($C_{P1}$) and the inductor (L).

The compensating network components may be $$C_{P1} = \frac{1}{\omega^2 L_{P1}} = \frac{1}{\omega^2\left(1 - k\alpha^{-1}\right)L_1}, \; C_{P2} = \frac{1}{\omega^2 L_{P2}} = \frac{1}{\omega^2 k\alpha^1 L_1},$$

$$L = -L_{P3}.$$

ZVS may be obtained by adjusting adjust the value of L to be:

$$L = n^{-2}\omega^{-1}R_{L,min}tg\varphi * -L_{P3}.$$

The compensation network may comprise:
a) a first capacitor ($C_{S1}$) connected in series with the self-inductance ($L_2$) of the primary side, for compensating voltage drops across the self-inductance ($L_2$) of the secondary side;
b) an inductor (L) connected in series with the input of the rectifier; and
c) a second capacitor ($C_{S2}$), one contact of which being connected to one contact of the secondary coil of the LCT, and the other contact of which being connected to the mutual point connecting between the first capacitor ($C_{S1}$) and the inductor (L).

The compensating network components may be $$C_{S1} = \frac{1}{\omega^2 L_{S1}} = \frac{1}{\omega^2\left(1 - \alpha k\right)L_2}, \; C_{S2} = \frac{1}{\omega^2 L_{S2}} = \frac{1}{\omega^2 \alpha k L_2},$$

$$L = -L_{S3}.$$

ZVS may be obtained by adjusting adjust the value of L to be:

$$L = \omega^{-1}R_{L,min}tg\varphi * -L_{S3}.$$

An efficiently compensated Inductive Wireless Power Transfer (IWPT) system, comprising:
a) an LCT having a primary side and a secondary side;
b) an inverter that converts the input DC power to AC power at a predetermined operating frequency, the output of the inverter is being connected to the self-inductance ($L_P$) of the primary side of the LCT via a compensation network consisting of a combination of capacitors and at least one inductor and residing solely at the primary side;
c) a rectifier for converting AC power, induced at the secondary side of the LCT, to DC power, the input of the rectifier is being connected to the self-inductance ($L_S$) of the secondary side of the LCT;
d) a load being connected to the output of the rectifier; and
e) a DC power supply for feeding DC power to the input of the inverter and generating an induced power that is fed to the load.

The compensation network may comprise:
d) a first inductor ($L_{P2}$) connected in parallel to the input of the primary side;
e) a first capacitor ($C_{P1}$) connected in series with the self-inductance ($L_{P1}$) of the primary side, for compensating voltage drops across the self-inductance ($L_{P1}$) of the primary side;
f) a second capacitor ($C_{P3}$) connected in series with the first capacitor ($C_{P1}$), for compensating voltage drops across the reflection ($L_{C3}$) of the self-inductance of the secondary side to the primary side; and
g) a third capacitor ($C_{P2}$), one contact of which being connected to one contact of the primary coil of the LCT, and the other contact of which being connected to the mutual point connecting between the second capacitor ($C_{P3}$) and the first capacitor ($C_{P1}$), for compensating voltage drops across the first inductor ($L_{P2}$).

The system may further comprise a compensation inductance (L) connected in series between the output of the inverter and the compensating capacitance ($C_{P3}$), for absorbing unwanted high voltage spikes.

A system for efficiently compensating an Inductive Wireless Power Transfer (IWPT) system, comprising:
a) an LCT having a primary side and a secondary side;
b) an inverter that converts input DC power to AC power at a predetermined operating frequency, the output of the inverter is being connected to the self-inductance of the primary side of the LCT;
c) a rectifier for converting AC power, induced at the secondary side of the LCT, to DC power, the input of the rectifier is being connected to the self-inductance of the secondary side of the LCT via a compensation network consisting of a combination of capacitors and at least one inductor and residing solely at the secondary side;
d) a load, being connected to the output of the rectifier; and
e) a DC power supply for feeding DC power to the input of the inverter and generating an induced power that is fed to the load.

The compensation network may comprise:
h) a first capacitor ($C_{P1}$) connected in series with the self-inductance ($L_1$) of the primary side, for compensating voltage drops across the self-inductance ($L_1$) of the primary side;
i) an inductor (L) connected in series with the output of the inverter; and
j) a second capacitor ($C_{P2}$), one contact of which being connected to one contact of the primary coil of the LCT, and the other contact of which being connected to the mutual point connecting between the first capacitor ($C_{P1}$) and the inductor (L).

The compensation network may comprise:
k) a first capacitor ($C_{S1}$) connected in series with the self-inductance ($L_2$) of the primary side, for compensating voltage drops across the self-inductance ($L_2$) of the secondary side;
l) an inductor (L) connected in series with the input of the rectifier; and
m) a second capacitor ($C_{S2}$), one contact of which being connected to one contact of the secondary coil of the LCT, and the other contact of which being connected to the mutual point connecting between the first capacitor ($C_{S1}$) and the inductor (L).

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PRESENT INVENTION

The present invention provides a generalized compensation network for Inductive Wireless Power Transfer Links (IWPTLS), operating at a resonant frequency, which resides only at the primary or the secondary side of the LCT. The generalized compensation network may be implemented using two derived supplementary basic topologies that utilize three (or two in particular cases) compensation capacitors, by placing all compensation capacitors at the same side of the LCT, while leaving the other one uncompensated. As a resulting advantage, the weight and/or volume of the transmitter or the receiver may be reduced. Also, these topologies may minimize the receiver in terms of either cost, complexity or reliability.

Derivation of the Proposed Compensation Topology

Figure 1A:
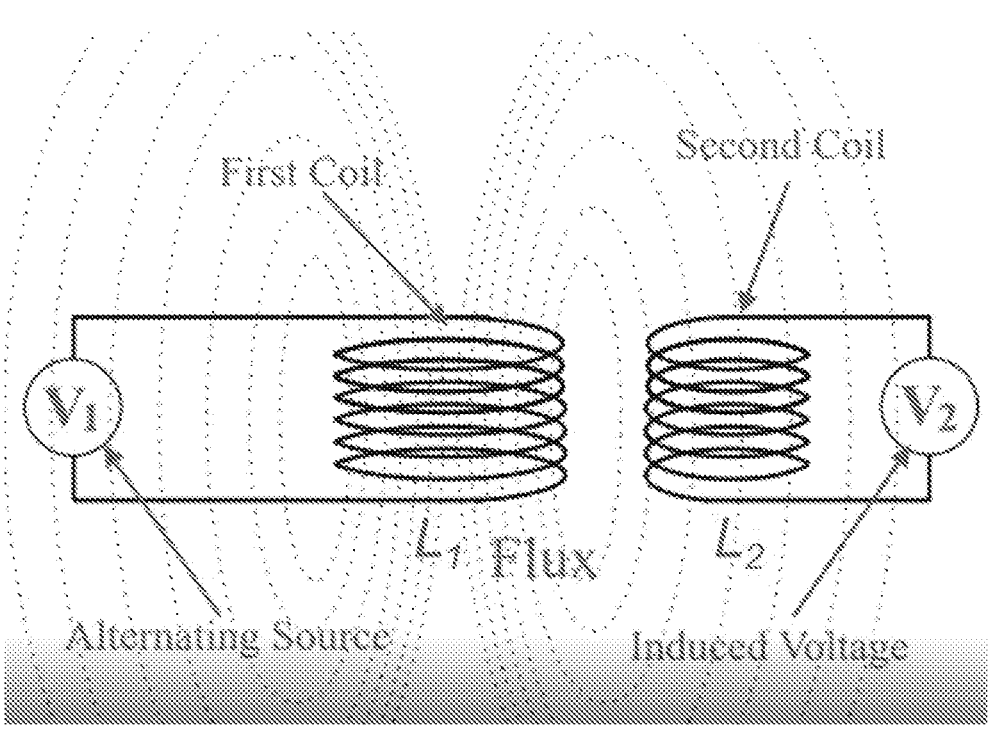
FIG. 1A illustrates inductive wireless power transfer using an LCT.
Figure 1B:
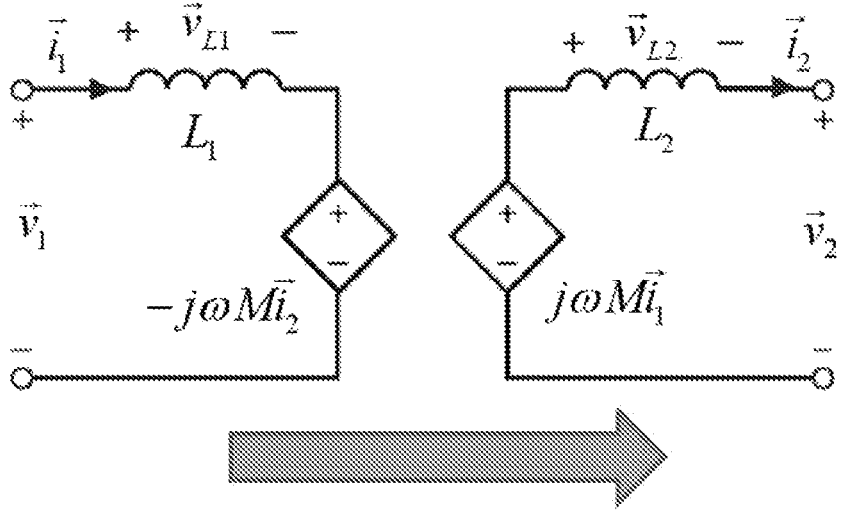
FIG. 1B illustrates a phasor representation of the LCT.

FIG. 1B illustrates a phasor representation of the LCT, where the power that is transmitted from the primary side to the secondary side is given by $0.5\omega kMI_1I_2$. Therefore, in order to increase the amount of power transferred, it is required to increase the resonant frequency or the mutual coupling or the current $I_1$. However, since the self-inductances $L_1$ and $L_2$ are in series with the voltage, increasing resonant frequency or the mutual coupling or the current $I_1$ will cause larger voltage drop across each self-inductance.

Figure 1C:
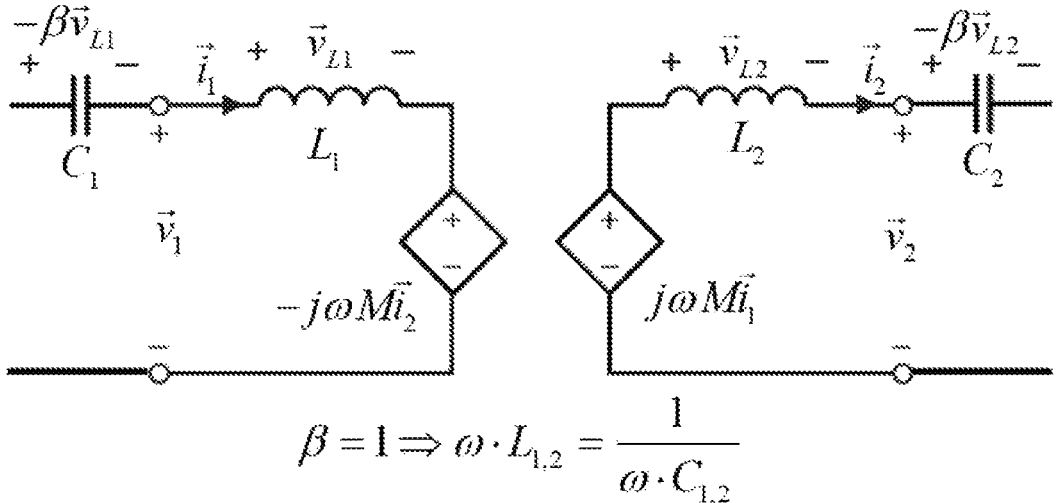
FIG. 1C A shows typical dual-side series-series compensation.

The way to cancel the unwanted voltage drop across the self-inductances $L_1$ and $L_2$ is to add a compensation network to each side of the transformer. A simple compensation may be achieved by adding a series capacitance to each self-inductance, as shown in FIG. 1C. In this example, $C_1$ (partially of fully) compensates the voltage drop across $L_1$ and $C_2$ (partially of fully) compensates the voltage drop across $L_2$.

Figure 1D:
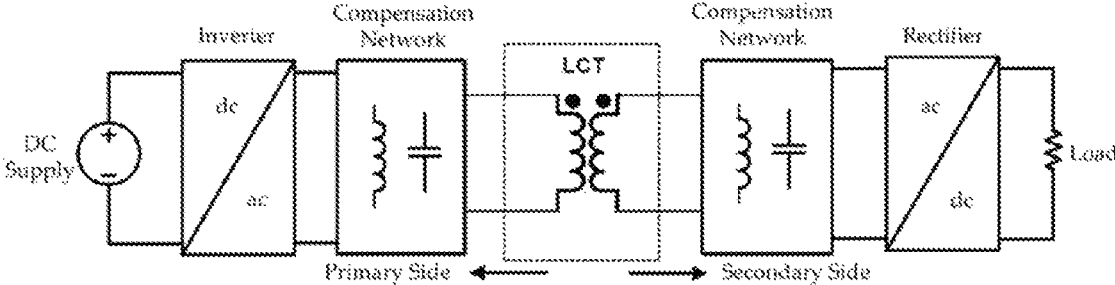
FIG. 1D illustrates a block diagram of a typical IWPTL.

FIG. 1D illustrates a block diagram of a typical IWPTL. The primary side of the LCT comprises a DC supply which feeds an inverter that converts the input DC supply to an AC supply. The AC signal generated by the inverter is fed into the primary coil of the LCT via an input compensation network. At the secondary side, the AC energy transferred to the secondary coil of the LCT is fed into a rectifier (that converts it back to DC energy to be delivered to the load) via an output compensation network.

Figure 2A:
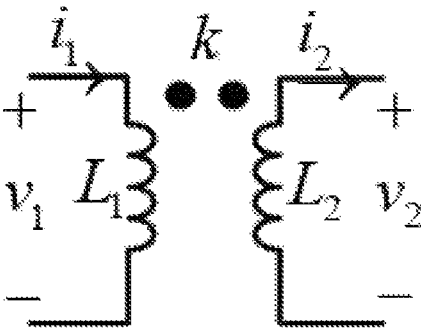
FIG. 2A shows a symbolic representation of a Loosely-Coupled Transformer (LCT)

FIGS. 2A-2D illustrate equivalent circuits of an LCT, which can be described by the following relations $$v_1(t) = L_1 \frac{di_1(t)}{dt} - k\sqrt{L_1L_2}\frac{di_2(t)}{dt} \qquad \text{(Eq. 1)}$$
$$v_2(t) = -L_2\frac{di_2(t)}{dt} + k\sqrt{L_1L_2}\frac{di_1(t)}{dt},$$

where $L_1$ and $L_2$ in FIG. 2A represent the primary and the secondary coils self-inductances, respectively, $0{\leq}k{\leq}1$ denotes the coils' coupling coefficient with $k{<}1$, and the mutual magnetic coupling M between $L_1$ and $L_2$ is represented by $M=k\sqrt{L_1L_2}$.

The compensation network provided by the present invention is implemented such that all the compensating capacitors and inductors will reside at the primary (the transmitting) side, such that the secondary (the receiving) side will include uncompensated inductor which feeds the load (in this example, a rectifier). For example, a drone that should be wirelessly recharged (by hovering above a stationary charging station) may comprise the secondary (the receiving) side, while the stationary charging station will comprise the compensating network. This will reduce extra weight and save space in the drone.

Alternatively, the compensation network provided by the present invention may be implemented such that all the compensating capacitors and inductors will reside in the secondary (the receiving) side, such that the primary (the transmitting) side, will include an uncompensated inductor which is fed by the source (in this example, an inverter), depending on the application. For example, a drone that should wirelessly collect data from deployed sensors (by hovering above each stationary sensor) may comprise the primary (the transmitting) side with the compensating network, while each deployed sensor will comprise the secondary (the receiving) side. This will allow making the sensors smaller and battery-less, such that the energy transmitted from the drone will activate the sensor for a short period of time, being sufficient to transmit the collected data to the drone.

Figure 2B:
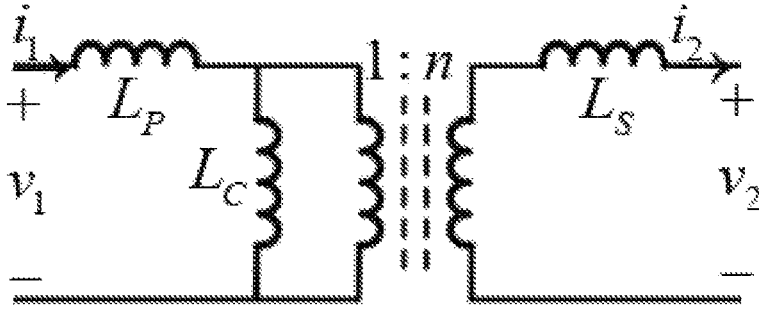
FIG. 2B shows a generalized equivalent circuit of the LCT.

The LCT may be represented by a generalized ideal-transformer-based equivalent circuit shown in FIG. 2B with arbitrary $\alpha$ and parameters related to (1) as $$L_P = (1 - k\alpha^{-1})L_1, L_C = k\alpha^{-1}L_1, L_S = (1-\alpha k)L_2, \qquad \text{(Eq. 2)}$$
$$n = \alpha\sqrt{\frac{L_1}{L_2}}$$

Figure 2C:
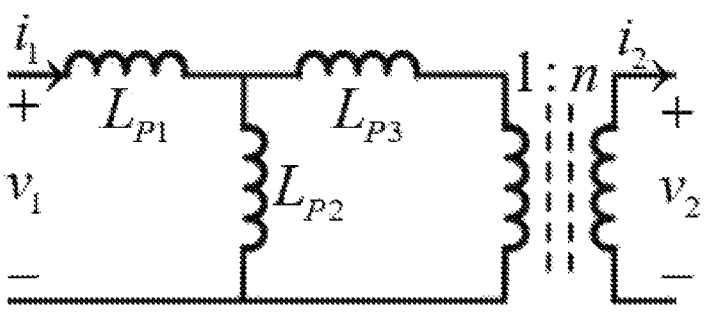
FIG. 2C shows a generalized equivalent circuit of FIG. 2B, reflected to the primary side.

Reflection to Primary Side It is possible to reflect the secondary-side equivalent inductance LS to the primary side so that equivalent circuit shown in FIG. 2C is created using $$L_{P1} = (1-k\alpha^{-1})L_1, L_{P2} = k\alpha^{-1}L_1, L_{P3} = \frac{L_s}{n^2} = \frac{1-\alpha k}{\alpha^2}L_1. \qquad \text{(Eq. 3)}$$

Reflection to Secondary Side

Figure 2D:
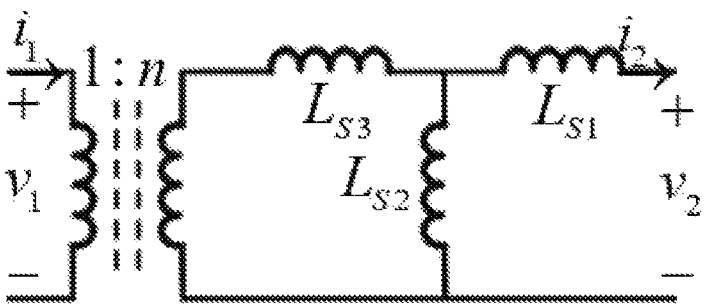
FIG. 2D shows a generalized equivalent circuit of FIG. 2B, reflected to the secondary side.

Similarly, it is possible to reflect the primary-side equivalent inductances $L_C$ and $L_P$ to the secondary side so that equivalent circuit shown in FIG. 2D is created using $$L_{S1} = (1 - \alpha k) L_2, \tag{Eq. 4}$$

$$L_{S2} = L_C n^2 = \alpha k L_2, \ L_{S3} = L_P n^2 = (1 - k\alpha^{-1}) \alpha^2 L_2.$$

The present invention provides several possible compensation networks. The first compensation network comprises an Inductor and Triple-capacitor.

In case all the three inductances in (3) and (4) are positively valued (i.e.

$$k \leq \alpha \leq k^{-1}$$

is selected), all the three inductances may be fully compensated by three (star or delta connected) capacitances, to yield load-independent current or voltage output, as shown for primary-only compensation (FIG. 3A) and for secondary-only compensation (FIG. 3B) with star-connected compensation capacitors. However, practical IWPTLS typically employ a voltage-source inverter at the transmitting side and a voltage-source rectifier at the receiving side. Consequently, the input of the transmitting-side compensation network and the output of the receiving-side compensation network possess high dv/dt and should not be connected to capacitive network, so as to avoid high current spikes.

As a result, a compensating inductance has to be inserted either in series between inverter output and compensation network in case of primary-only compensation or between compensation network and rectifier input in case of secondary-only compensation. Alternatively, the additional inductance may be inserted in series with shunt compensating capacitances $C_{P2}$ or $C_{S2}$. A compensating inductance may be inserted in series with inverter DC terminals in case of primary-only compensation or with rectifier DC terminals in case of secondary-only compensation.

Figure 3A:
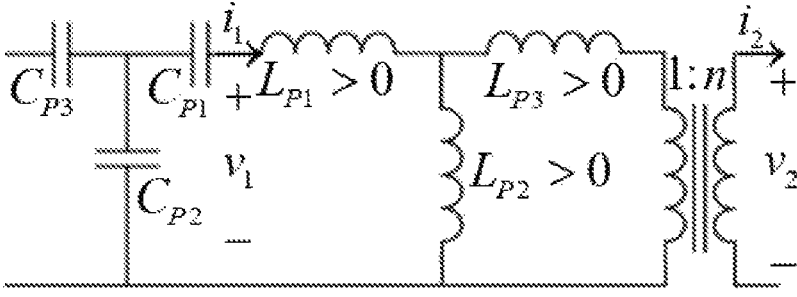
FIG. 3A shows primary-only compensation with star-connected compensation capacitors, under sinusoidal excitation.
Figure 3B:
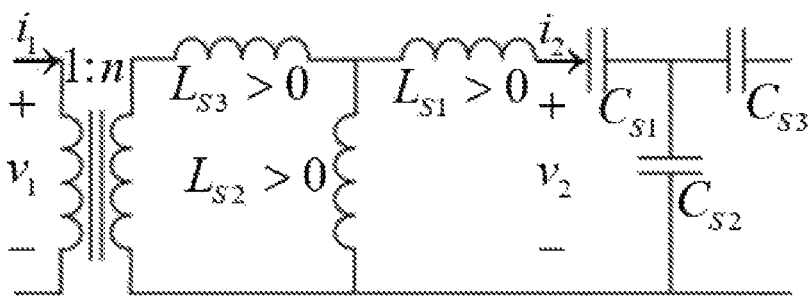
FIG. 3B shows secondary-only compensation with star-connected compensation capacitors, under sinusoidal excitation.

FIG. 3A illustrates a possible power stage of a primary-side-only fully compensated IWPTL, using single-inductor and three capacitors. FIG. 3B illustrates a possible power stage of a secondary-side-only fully compensated IWPTL, using single-inductor and three capacitors. $V_I$ and $V_O$ denote input and output DC voltages, respectively. $C_I$ and $C_O$ stand for input and output DC filter capacitances, respectively, while $R_O$ represents the equivalent load resistance.

The inverter is operated at frequency $\omega$, so that its output voltage is given by $$v_{inv}(t) = \begin{cases} 0, & 0 \leq \omega t < \beta, \ \pi - \beta \leq \omega t < \pi \\ V_I, & \beta \leq \omega t < \pi - \beta \\ 0, & \pi \leq \omega t < \pi + \beta, \ 2\pi - \beta \leq \omega t < 2\pi \\ -V_I, & \pi + \beta \leq \omega t < 2\pi - \beta \end{cases} \tag{Eq. 5}$$

where $0 \leq \beta \leq 0.5\pi$ represents the inverter's phase shift angle.

Considering a continuous-conduction mode, the rectifier input voltage is given by $$v_{rec}(t) = \begin{cases} V_O, & \theta < \omega t \leq \pi + \theta \\ -V_O & \pi + \theta < \omega t \leq 2\pi + \theta \end{cases}. \tag{Eq. 6}$$

Figure 4A:
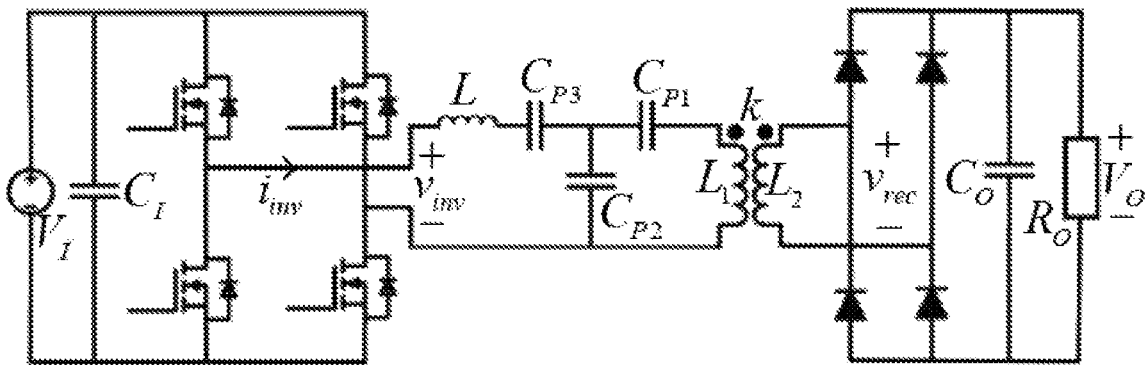
FIG. 4A illustrates a primary-side-only single-inductor tripple-capacitor fully compensated IWPTL.

FIGS. 3A and 4A show a primary-only compensation. By selecting compensating capacitors values as $$C_{P1} = \frac{1}{\omega^2 L_{P1}} = \frac{1}{\omega^2 (1 - k\alpha^{-1}) L_1}, \ C_{P2} = \frac{1}{\omega^2 L_{P2}} = \frac{1}{\omega^2 k\alpha^{-1} L_1}, \tag{Eq. 7}$$

$$C_{P3} = \frac{1}{\omega^2 (L_{P3} + L)} = \frac{1}{\omega^2 \left( \frac{1 - \alpha k}{\alpha^2} L_1 + L \right)}$$

and considering sinusoidal excitation, an arbitrary load-independent and coupling-independent voltage gain is obtained, and is given by $$G_V = \frac{|\vec{v}_{rec}|}{|\vec{v}_{inv}|} = |n| = \left| \alpha \sqrt{\frac{L_2}{L_1}} \right| \tag{Eq. 8}$$

with $$|\vec{v}_{inv}| = 4\pi^{-1} V_I \cos \beta, \ |\vec{v}_{rec}| = 4\pi^{-1} V_O, \ R_L = 8\pi^{-2} R_O. \tag{Eq. 9}$$

Therefore, in order to obtain an arbitrary voltage gain $G_V^*$, $\alpha$ should be set to $$|\alpha| = G_V^* \sqrt{\frac{L_1}{L_2}} \tag{Eq. 10}$$

and compensation capacitances are sized accordingly (Eq. 7).

The inverter output impedance is given by $$\vec{Z}_{in} = \frac{\vec{v}_{inv}}{\vec{i}_{inv}} = \frac{R_L}{n^2} = \frac{R_L}{a^2} \frac{L_1}{L_2} \square 0, \tag{Eq. 11}$$

Therefore, ZPA is attained.

In practical systems, ZVS rather (than ZPA) operation of the inverter is desired, in order to reduce switching losses. Therefore, $\vec{Z}_{in}$ should be slightly inductive. In order to achieve this, it is possible to adjust the value of $C_{P3}$ as follows:

Neglecting inductors' ESRs and selecting the values of $C_{P1}$ and $C_{P2}$ according to (7), the inverter output impedance at operating frequency is given by $$\vec{Z}_{inv}(\omega) = \frac{R_L}{n^2} + j \left( \omega L + \omega L_{P3} - \frac{1}{\omega C_{P3}} \right) \tag{Eq. 12}$$

and corresponding phase angle is given by $$\varphi = \arg \vec{Z}_{inv}(\omega) = tg^{-1} \frac{\omega L + \omega L_{P3} - \omega C_{P3})^{-1}}{n^2 R_L}. \tag{Eq. 13}$$

Hence, if $\varphi^*$ is the phase angle required to assure ZVS operation for the entire load range, the value of the series compensating capacitor should be modified as $$C_{P3}^{-1} = \omega^2(L + L_{P3}) - n^{-2}\omega R_{L,min} tg\varphi^*. \qquad \text{(Eq. 14)}$$

where $R_{L,min}$ is the minimum expected value of equivalent AC resistance $R_L$ in (9), that corresponds to a maximum system loading.

Figure 4B:
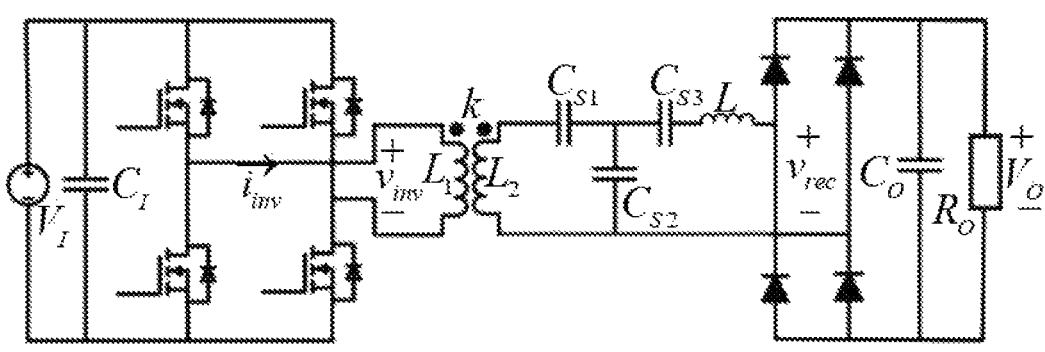
FIG. 4B illustrates a secondary-side-only tripple-capacitor single-inductor fully compensated IWPTL.

FIGS. 3B and 4B show a secondary-only compensation. By selecting compensating capacitors values as $$C_{S1} = \frac{1}{\omega^2 L_{S1}} = \frac{1}{\omega^2(1 - \alpha k)L_2}, \quad C_{S2} = \frac{1}{\omega^2 L_{S2}} = \frac{1}{\omega^2 \alpha k L_2}, \qquad \text{(Eq. 15)}$$

$$C_{S3} = \frac{1}{\omega^2(L_{S3} + L)} = \frac{1}{\omega^2\left((1 - k\alpha^{-1})\alpha^2 L_2 + L\right)} \qquad \text{(Eq. 15)}$$

under sinusoidal excitation, arbitrary load and coupling independent voltage gain (Eqs. 8, 9) are obtained. Therefore, in order to obtain an arbitrary load-independent voltage gain $G_V^*$, a should be selected as in (10) and the compensation capacitances is sized accordingly (cf. Eq. 15). The inverter's output impedance that is given by (11) shows that ZPA is attained. In order to achieve ZVS, it is possible to adjust the value of $C_{S3}$ as follows:

Neglecting inductors' ESRs and selecting the values of $C_{S1}$ and $C_{S2}$ according to (Eq. 15), the inverter output impedance at operating frequency is given by $$\vec{Z}_{inv}(\omega) = \frac{1}{n^2}\left(R_L + j\left(\omega L + \omega L_{S3} - \frac{1}{\omega C_{S3}}\right)\right) \qquad \text{(Eq. 16)}$$

and the corresponding phase angle is given by $$\varphi = \arg\vec{Z}_{inv}(\omega) = tg^{-1}\frac{\omega L + \omega L_{S3} - (\omega C_{S3})^{-1}}{R_L}. \qquad \text{(Eq. 17)}$$

Hence, by denoting the phase angle required to assure ZVS operation for the entire load range by $\varphi^*$ (taking into account $\beta$ in (5)), the value of series compensating capacitor $C_{S3}$ should be modified as $$C_{S3}^{-1} = \omega^2(L + L_{S3}) - \omega R_{L,min} tg\varphi^*. \qquad \text{(Eq. 18)}$$

Figure 5A:
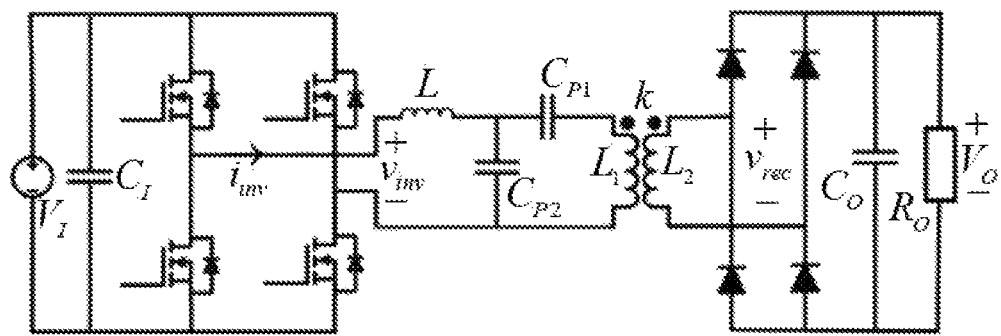
FIG. 5A illustrates a primary-side-only single-inductor dual-capacitor fully compensated IWPTL.

Compensation by an Inductor and Two Capacitors:

FIG. 5A shows primary-only compensation.

From (3) and (4), it may be concluded that for the range of $\alpha$ given by $$\alpha > k^{-1}, \qquad \text{(Eq. 19)}$$

In case of reflection to the primary side, the values of $L_{P1}$ and $L_{P2}$ remain positive, while the value of $L_{P3}$ becomes negative. Consequently, $L_{P3}$ should be compensated by inductance rather than by capacitance $C_{P3}$. Since in practice, an inductance L is already present in series with $C_{P3}$ (cf. FIG. 4A), L may be sized accordingly, to compensate the negative $L_{P3}$. Therefore, this primary compensation network includes one inductor and two capacitors, as shown in FIG. 5A.

Sizing compensating network components as $$C_{P1} = \frac{1}{\omega^2 L_{P1}} = \frac{1}{\omega^2(1 - k\alpha^{-1})L_1}, \quad C_{P2} = \frac{1}{\omega^2 L_{P2}} = \frac{1}{\omega^2 k\alpha^1 L_1}, \qquad \text{(Eq. 20)}$$

$$L = -L_{P3}$$

and considering sinusoidal excitation, an arbitrary load-independent and coupling-independent voltage gain, given by (8), is obtained. Therefore, in order to obtain an arbitrary voltage gain $G_V^*$, $\alpha$ should be selected as in (10) and compensation network elements sized accordingly (cf. (20)). The inverter's output impedance is given by (11), so ZPA is attained. In order to obtain ZVS, it is possible to adjust the value of L as follows:

By neglecting inductors' ESRs and selecting the values of $C_{P1}$ and $C_{P2}$ according to (20), the inverter output impedance at operating frequency is given by $$\vec{Z}_{inv}(\omega) = \frac{R_L}{n^2} + j(\omega L + \omega L_{P3}) \qquad \text{(Eq. 21)}$$

and corresponding phase angle is given by $$\varphi = \arg\vec{Z}_{inv}(\omega) = tg^{-1}\frac{\omega L + \omega L_{P3}}{n^{-2}R_L}. \qquad \text{(Eq. 22)}$$

Hence, by denoting the phase angle required to assure ZVS operation for the entire load range by $\varphi^*$, the value of series compensating capacitor $C_{S3}$ should be modified as $$L = n^{-2}\omega^{-1}R_{L,min} tg\varphi^* - L_{P3}. \qquad \text{(Eq. 23)}$$

FIG. 5A shows secondary-only compensation.

Figure 5B:
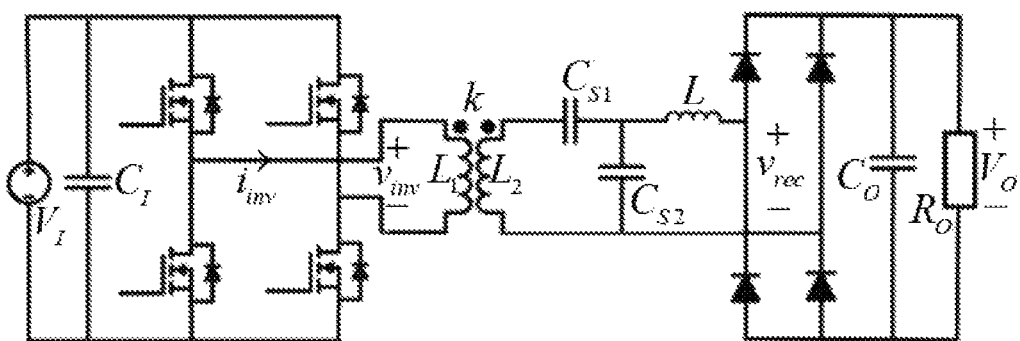
FIG. 5B illustrates a secondary-side-only single-inductor dual-capacitor fully compensated IWPTL.

On the other hand, for the range of $\alpha$ given by $$0 < \alpha < k, \qquad \text{(Eq. 24)}$$

in case of reflection to secondary side, the values of $L_{S1}$ and $L_{S2}$ remain positive, while the value of $L_{S3}$ becomes negative. Consequently, $L_{S3}$ should be compensated by inductance rather than capacitance $C_{S3}$. Since in practice, an inductance L is already present in series with $C_{S3}$ (cf. FIG. 4b), it may be sized accordingly to compensate the negative $L_{S3}$ so that secondary compensation network includes one inductor and two capacitors (as shown in FIG. 5B).

Sizing compensating network components as $$C_{S1} = \frac{1}{\omega^2 L - S1} = \frac{1}{\omega^2(1 - \alpha k)L_2}, \quad C_{S2} = \frac{1}{\omega^2 L_{S2}} = \frac{1}{\omega^2 \alpha k L_2}, \qquad \text{(Eq. 25)}$$

and considering sinusoidal excitation, an arbitrary load and coupling independent voltage gain, given by (8) is obtained. Therefore, in order to obtain an arbitrary load-independent voltage gain $G_V^*$, $\alpha$ should be selected as in (10) and compensation capacitances sized accordingly (cf. (25)). In order to achieve ZVS, it is possible to adjust the value of L as follows:

By neglecting inductors' ESRs and selecting the values of $C_{S1}$ and $C_{S2}$ according to (25), the inverter output impedance at operating frequency is given by $$\vec{Z}_{inv}(\omega) = n^{-2}(R_L + j(\omega L + \omega L_{S3})) \qquad \text{(Eq. 26)}$$

and the corresponding phase angle is given by $$\varphi = \arg \vec{Z}_{inv}(\omega) = tg^{-1}\frac{\omega L + \omega L_{S3}}{R_L}. \qquad \text{(Eq. 27)}$$

Hence, by denoting the phase angle required to assure ZVS operation for the entire load range by $\varphi^*$ (taking into account $\beta$ in (5)), the value of series compensating inductance should be modified as $$L = \omega^{-1}R_{L,min}tg\varphi^* - L_{S3}. \qquad \text{(Eq. 28)}$$

Although embodiments of the invention have been described by way of illustration, it will be understood that the invention may be carried out with many variations, modifications, and adaptations, without exceeding the scope of the claims.

The invention claimed is:

1. A method for efficiently compensating an Inductive Wireless Power Transfer (IWPT) system, comprising:
   a) providing an LCT having a primary side and a secondary side;
   b) providing a DC power supply for feeding input DC power to said IWPT system;
   c) providing an inverter that converts said input DC power to AC power at a predetermined operating frequency;
   d) connecting the output of said inverter to a self-inductance ($L_P$) of the primary side of said LCT via a compensation network consisting of a combination of capacitors and at least one inductor and residing solely at said primary side, wherein the compensation network is configured to compensate for voltage drops across the self-inductance ($L_P$) of the primary side and secondary-side equivalent inductances as reflected to the primary side, with no additional compensating capacitors or inductors on the secondary side;
   e) providing a rectifier for converting AC power, induced at the secondary side of said LCT, to DC power;
   f) connecting the input of said rectifier to a self-inductance ($L_S$) of said secondary side of said LCT;
   g) connecting a load to the output of said rectifier; and
   h) feeding DC power to the input of said inverter and generating an induced power that is fed to said load.

2. The method according to claim 1, wherein the compensation network comprises:
   a) a first inductor ($L_{P2}$) connected in parallel to the input of said primary side;
   b) a first capacitor ($C_{P1}$) connected in series with said self-inductance ($L_{P1}$) of said primary side, for compensating voltage drops across the self-inductance ($L_{P1}$) of the primary side;
   c) a second capacitor ($C_{P3}$) connected in series with said first capacitor ($C_{P1}$), for compensating voltage drops across the reflection ($L_{C3}$) of the self-inductance of the secondary side to the primary side; and
   d) a third capacitor ($C_{P2}$), one contact of which being connected to one contact of the primary coil of said LCT, and the other contact of which being connected to the mutual point connecting between said second capacitor ($C_{P3}$) and said first capacitor ($C_{P1}$), for compensating voltage drops across said first inductor ($L_{P2}$).

3. The method according to claim 1, further comprising connecting a compensation inductance (L) in series between the output of the inverter and a compensating capacitance ($C_{P3}$), for absorbing unwanted high voltage spikes.

4. The method according to claim 1, wherein the inductances to be compensated at the primary side are $$L_P = \left(1 - k\alpha^{-1}\right)L_1, \quad L_C = k\alpha^{-1}L_1, \quad L_S = (1 - \alpha k)L_2,$$

$$n = \alpha\sqrt{\frac{L_2}{L_1}}$$

with an arbitrary a residing within $$k\sqrt{\frac{L_2}{L_1}} \le \alpha \le \frac{1}{k}\sqrt{\frac{L_2}{L_1}}.$$

5. The method according to claim 1, wherein the compensating capacitors are selected as $$C_{P1} = \frac{1}{\omega^2 L_{P1}} = \frac{1}{\omega^2\left(1 - k\alpha^1\right)L_1}, \quad C_{P2} = \frac{1}{\omega^2 L_{P2}} = \frac{1}{\omega^2 k\alpha^{-1}L_1},$$

$$C_{P3} = \frac{1}{\omega^2(L_{P3} + L)} = \frac{1}{\omega^2\left(\frac{1 - \alpha k}{\alpha^2}L_1 + L\right)}$$

6. The method according to claim 1, wherein the compensating capacitors are selected as $$C_{S1} = \frac{1}{\omega^2 L_{S1}} = \frac{1}{\omega^2(1 - \alpha k)L_2}, \quad C_{S2} = \frac{1}{\omega^2 L_{S2}} = \frac{1}{\omega^2 \alpha k L_2},$$

$$C_{S3} = \frac{1}{\omega^2(L_{S3} + L)} = \frac{1}{\omega^2\left(\left(1 - k\alpha^1\right)\alpha^2 L_2 + L\right)}$$

7. The method according to claim 1, wherein the inverter output impedance at operating frequency is given by $$\vec{Z}_{inv}(\omega) = \frac{1}{n^2}\left(R_L + j\left(\omega L + \omega L_{S3} - \frac{1}{\omega C_{S3}}\right)\right).$$

8. The method according to claim 1, wherein the inverter phase angle is given by $$\varphi = \arg \vec{Z}_{inv}(\omega) = tg^{-1}\frac{\omega L + \omega L_{S3} - (\omega C_{S3})^{-1}}{R_L}.$$

9. The method according to claim 1, wherein a load-independent voltage gain under sinusoidal excitation is given by $$G_V = \frac{|\hat{v}_{rec}|}{|\hat{v}_{inv}|} = |n| = \left|\alpha\sqrt{\frac{L_2}{L_1}}\right|.$$

10. A method for efficiently compensating an Inductive Wireless Power Transfer (IWPT) system, comprising:
   a) providing an LCT having a primary side and a secondary side;
   b) providing a DC power supply for feeding input DC power to said IWPT system;
   c) providing an inverter that converts said input DC power to AC power at a predetermined operating frequency;
   d) connecting the output of said inverter to a self-inductance of the primary side of said LCT;
   e) providing a rectifier for converting AC power, induced at the secondary side of said LCT, to DC power;
   f) connecting the input of said rectifier to a self-inductance of said secondary side of said LCT via a compensation network consisting of a combination of capacitors and at least one inductor and residing solely at said secondary side, wherein the compensation network is configured to compensate for voltage drops across the self-inductance of said secondary side and primary-side equivalent inductances as reflected to the secondary side, with no additional compensating capacitors or inductors on the primary side;
   g) connecting a load to the output of said rectifier; and
   h) feeding DC power to the input of said inverter and generating an induced power that is fed to said load.

11. The method according to claim 10, wherein the compensation network comprises:
   a) a first inductor ($L_{S2}$) connected in parallel to the input of said primary side;
   b) a first capacitor ($C_{S1}$) connected in series with said self-inductance ($L_{S1}$) of said primary side, for compensating voltage drops across the self-inductance ($L_{S1}$) of the primary side;
   c) a second capacitor ($C_{S3}$) connected in series with said first capacitor ($C_{S1}$), for compensating voltage drops across the reflection ($L_{S3}$) of the self-inductance of the secondary side to the primary side; and
   d) a third capacitor ($C_{S2}$), one contact of which being connected to one contact of the primary coil of said LCT, and the other contact of which being connected to the mutual point connecting between said second capacitor ($C_{S3}$) and said first capacitor ($C_{S1}$), for compensating voltage drops across said first inductor ($L_{S2}$).

12. The method according to claim 10, wherein the compensation network comprises:
   a) a first capacitor ($C_{P1}$) connected in series with the self-inductance ($L_1$) of said primary side, for compensating voltage drops across the self-inductance ($L_1$) of the primary side;
   b) an inductor (L) connected in series with the output of said inverter; and
   c) a second capacitor ($C_{P2}$), one contact of which being connected to one contact of the primary coil of said LCT, and the other contact of which being connected to the mutual point connecting between said first capacitor ($C_{P1}$) and said inductor (L).

13. The method according to claim 10, wherein the compensation network comprises:
   a) a first capacitor ($C_{S1}$) connected in series with the self-inductance ($L_2$) of said primary side, for compensating voltage drops across the self-inductance ($L_2$) of the secondary side;

b) an inductor (L) connected in series with the input of said rectifier; and
   c) a second capacitor ($C_{S2}$), one contact of which being connected to one contact of a secondary coil of said LCT, and the other contact of which being connected to the mutual point connecting between said first capacitor ($C_{S1}$) and said inductor (L).

14. An efficiently compensated Inductive Wireless Power Transfer (IWPT) system, comprising:
   a) an LCT having a primary side and a secondary side;
   b) an inverter that converts said input DC power to AC power at a predetermined operating frequency, the output of said inverter is being connected to a self-inductance ($L_P$) of the primary side of said LCT via a compensation network consisting of a combination of capacitors and at least one inductor and residing solely at said primary side, wherein the compensation network is configured to compensate for voltage drops across the self-inductance ($L_P$) of the primary side and secondary-side equivalent inductances as reflected to the primary side, with no additional compensating capacitors or inductors on the secondary side;
   c) a rectifier for converting AC power, induced at the secondary side of said LCT, to DC power, the input of said rectifier is being connected to a self-inductance ($L_S$) of said secondary side of said LCT;
   d) a load being connected to the output of said rectifier; and
   e) a DC power supply for feeding DC power to the input of said inverter and generating an induced power that is fed to said load.

15. The system according to claim 14, wherein the compensation network comprises:
   a) a first inductor ($L_{P2}$) connected in parallel to the input of said primary side;
   b) a first capacitor ($C_{P1}$) connected in series with said self-inductance ($L_{P1}$) of said primary side, for compensating voltage drops across the self-inductance ($L_{P1}$) of the primary side;
   c) a second capacitor ($C_{P3}$) connected in series with said first capacitor ($C_{P1}$), for compensating voltage drops across the reflection ($L_{C3}$) of the self-inductance of the secondary side to the primary side; and
   d) a third capacitor ($C_{P2}$), one contact of which being connected to one contact of the primary coil of said LCT, and the other contact of which being connected to the mutual point connecting between said second capacitor ($C_{P3}$) and said first capacitor ($C_{P1}$), for compensating voltage drops across said first inductor ($L_{P2}$).

16. The system according to claim 14, further comprising a compensation inductance (L) connected in series between the output of the inverter and the compensating capacitance ($C_{P3}$), for absorbing unwanted high voltage spikes.

17. The system according to claim 14, in which the compensation network comprises:
   a) a first capacitor ($C_{P1}$) connected in series with the self-inductance ($L_1$) of said primary side, for compensating voltage drops across the self-inductance ($L_1$) of the primary side;
   b) an inductor (L) connected in series with the output of said inverter; and
   c) a second capacitor ($C_{P2}$), one contact of which being connected to one contact of the primary coil of said LCT, and the other contact of which being connected to the mutual point connecting between said first capacitor ($C_{P1}$) and said inductor (L).

18. A system for efficiently compensating an Inductive Wireless Power Transfer (IWPT) system, comprising:

a) an LCT having a primary side and a secondary side;

b) an inverter that converts input DC power to AC power at a predetermined operating frequency, the output of said inverter is being connected to a self-inductance of the primary side of said LCT;

c) a rectifier for converting AC power, induced at the secondary side of said LCT, to DC power, the input of said rectifier is being connected to a self-inductance of said secondary side of said LCT via a compensation network consisting of a combination of capacitors and at least one inductor and residing solely at said secondary side, wherein the compensation network is configured to compensate for voltage drops across the self-inductance of said secondary side and primary-side equivalent inductances as reflected to the secondary side, with no additional compensating capacitors or inductors on the primary side;

d) a load, being connected to the output of said rectifier; and e) a DC power supply for feeding DC power to the input of said inverter and generating an induced power that is fed to said load.

19. The system according to claim 18, in which the compensation network comprises:

a) a first inductor ($L_{S2}$) connected in parallel to the input of said primary side;

b) a first capacitor ($C_{S1}$) connected in series with said self-inductance ($L_{S1}$) of said primary side, for compensating voltage drops across the self-inductance ($L_{s1}$) of the primary side;

c) a second capacitor ($C_{S3}$) connected in series with said first capacitor ($C_{S1}$), for compensating voltage drops across the reflection ($L_{S3}$) of the self-inductance of the secondary side to the primary side; and d) a third capacitor ($C_{S2}$), one contact of which being connected to one contact of the primary coil of said LCT, and the other contact of which being connected to the mutual point connecting between said second capacitor ($C_{S3}$) and said first capacitor ($C_{S1}$), for compensating voltage drops across said first inductor ($L_{S2}$).

20. The system according to claim 18, in which the compensation network comprises:

a) a first capacitor ($C_{S1}$) connected in series with the self-inductance ($L_2$) of said primary side, for compensating voltage drops across the self-inductance ($L_2$) of the secondary side;

b) an inductor (L) connected in series with the input of said rectifier; and c) a second capacitor ($C_{S2}$), one contact of which being connected to one contact of a secondary coil of said LCT, and the other contact of which being connected to the mutual point connecting between said first capacitor ($C_{S1}$) and said inductor (L).

* * * * *